Aug. 8, 1967  W. A. FOSS ET AL  3,334,364

TRACING AND RETRIEVING BUOY

Filed Aug. 25, 1965

INVENTORS.
WESLEY A. FOSS
JOHN A. CONWAY

BY P.R. Geisler,
ATTORNEY

United States Patent Office 3,334,364
Patented Aug. 8, 1967

3,334,364
TRACING AND RETRIEVING BUOY
Wesley A. Foss, 18055 SW. Lower Boones Ferry Road, Tigard, Oreg. 97223, and John A. Conway, Rte. 1, Box 257A, West Linn, Oreg. 97068
Filed Aug. 25, 1965, Ser. No. 482,638
2 Claims. (Cl. 9—9)

ABSTRACT OF THE DISCLOSURE

A buoy device for indicating the location of a submerged article upon release therefrom, the buoy device having a base portion secured to the article, a soluble gelatin disc holding the buoy portion of the device to the base portion prior to submersion, and a cord element wound on the buoy portion of the device, the two ends of the cord element being secured to the buoy portion of the device and to the article respectively.

---

This invention is concerned with a tracing and retrieving of articles which, when inadvertently dropped overboard in a body of water, sink to the bottom of the water whereupon their subsequent recovery is desired if possible.

Particularly the invention is concerned with the locating and retrieving of outboard motors, lost from boats on lakes and rivers, since such inadvertent loss of outboard motors is a very common occurrence, and the invention will therefore be described as employed in connection particularly with outboard motors. However, it is to be understood that the invention is not limited to use with any particular article or type of articles since, as will be apparent, the invention may be employed similarly with various articles.

When an object, such as an outboard motor, is accidentally lost overboard and the body of water into which it is dropped is reasonably deep, the exact location at which it will be resting on the bottom of the water is generally not known, for even if the boat from which it is lost is stopped immediately, the momentum of the boat, the current of the water, the wind, etc., will make it difficult to determine its probable location very accurately. Even if the approximate location is momentarily known there is ordinarily no way of marking such approximate location on the water, and as a result a subsequent attempt by divers to locate the lost motor or other article may either require a long search or else prove entirely unsuccessful.

The object of the invention is to provide a device, suitable for attachment to an outboard motor or other article likely to be lost overboard, which, when the lost article is submerged in the water, will rise to the surface while remaining attached to the article and continue to float on the surface as an indicating marker or buoy.

A further object of the invention is to provide such an indicating device, which, when the article to which it is attached is lost overboard, will sink to the bottom of the body of water with a lost article, whereupon a buoyant portion of the device will detach itself from the base of the device and rise to the top of the water, while still remaining connected by a suitable line with the article on the bottom, and, providing the connecting line is strong enough, will enable the lost article to be retrieved directly by means of the line.

An additional object is to provide a simple and practical device designed to operate automatically to serve as a buoy to mark the location of a lost article in the water, and thus aid the recovery of the same, and particularly a device which will be easy to manufacture and of such low cost that it will find ready acceptance on the part of motor boat owners and will become a customary accessory with outboard motors.

The manner in which the tracing buoy of the present invention accomplishes these objects and its construction and operation will be readily understood from the following brief description with reference to the accompanying drawings.

Figure 1:
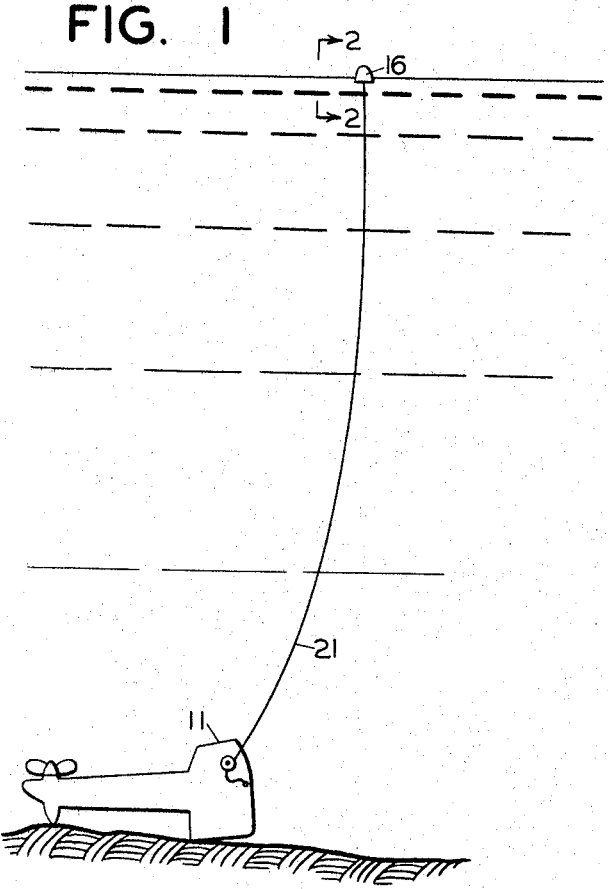
FIGURE 1 is a more or less diagrammatic representation illustrating the device of the present invention with the base portion and bottom end of a line attached to an outboard motor on the bottom of a body of water and with the upper portion of the device with the upper end of the line attached acting as a location-indicating buoy on the surface of the water.
Figure 4:
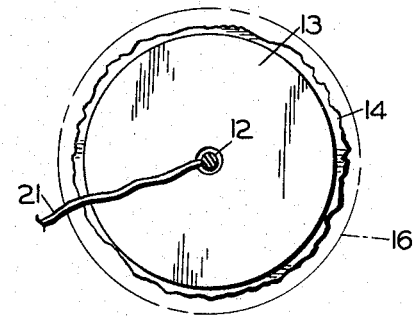
Figure 3:
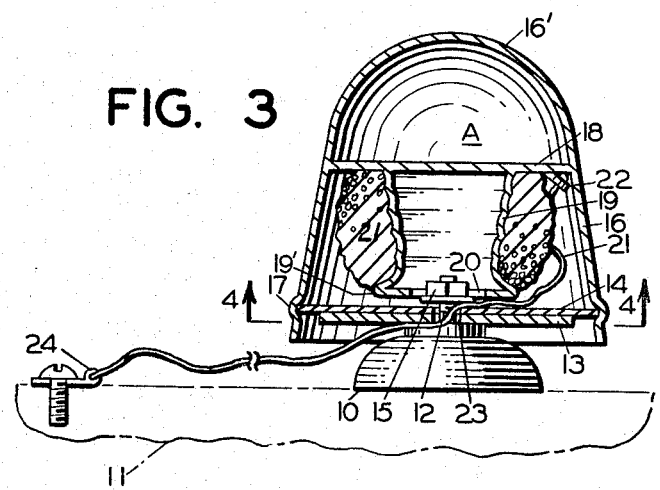
Figure 2:
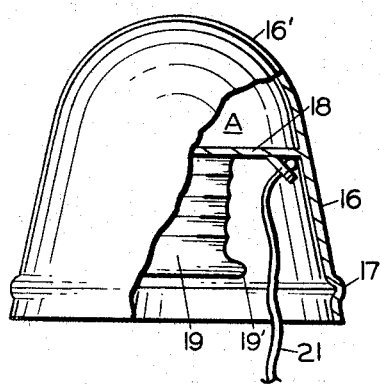
FIGURE 2 is an elevation of the upper or buoy portion of the device detached from its base taken on line 2—2 of FIGURE 1, drawn to a larger scale, with portion of the outer shell broken away.

FIGURE 3 is a sectional elevation of the entire device, drawn to the same scale as FIGURE 2, showing the device attached to an object, such as an outboard motor, before being lost overboard, a portion of such object being indicated by broken lines; and FIGURE 4 is a section on line 4—4 of FIGURE 3 but taken after the buoy portion of the device has separated itself from the base portion as a result of being submerged, the bottom rim shell or housing of the buoy portion being indicated by broken lines.

Referring first to FIGURE 3, the device includes a base assembly 10 which preferably, though not necessarily, may include a rubber suction cup so as to enable the device readily to be mounted on the surface of an outboard motor 11 or other article. A clamping bolt 12, having its head secured to or embedded in the top of the base member, extends through center openings in a bottom protective disc 13 and in an upper disc 14 of larger diameter than the disc 13, and carries a suitable clamping nut 15 and interposed washer. Thus, the disc 14 and the bottom protective disc 13 are securely attached to the base member to form parts of the base assembly.

A housing shell 16, open at the bottom, preferably is shaped substantially as shown in FIGURES 2 and 3, being circular in cross section with the diameter decreasing from bottom to top, and having a top portion 16' in the shape of a round dome. This housing shell is made preferably either of plastic or of thin sheet metal. Near the bottom of this housing shell the wall is formed with an outwardly extending annular groove 17 the inside diameter of which is slightly larger than the diameter of the open bottom end of the housing shell and approximately equal to the peripheral diameter of the upper disc 14, as shown in FIGURE 3. As apparent from this figure, the purpose of the outwardly extending annular groove 17 is to enable the housing shell 16 to be snapped down in place over the upper disc 14 and in this way to remain attached to the upper disc 14, and therewith to the base assembly 10, as long as the upper disc 14 continues to retain its full size and shape.

The upper disc 14, for a reason presently apparent, is made of gelatine or other normally stiff material which is readily soluble in water. The lower protective disc 13 on the other hand is made of metal or strong plastic, or other material not soluble in water, so as to protect the upper disc 14 from possible breakage or inadvertent damage while the device is out of water. The lower disc 13, while protecting the upper disc from inadvertent breakage, is of sufficiently smaller diameter than the upper disc, as shown in FIG. 3, so as not to come into engagement with the wall of the housing shell 16.

The top or dome portion 16' of the housing shell has an integral partition 18 which forms a sealed-in air chamber A in the top of the housing shell. A hollow member 19, preferably in the form of an inverted cone frustum, with annular surface ridges, extends down from the bottom face of the partition 18, being formed integrally with the partition 18 or firmly secured thereto, and is centrally positioned in the housing shell. The bottom face of the member 19 has an opening 20 of sufficient size to accommodate the top of the bolt 12 and nut 15 freely so that the member 19 will not be engaged by the base assembly 10.

A cord or line 21, of sufficient length to reach from the bottom to the top of any ordinary body of water in which the device is likely to be used, has its upper end secured to the housing shell and upper dome portion thereof by being attached to a suitable fastening element, such as the eyelet 22 mounted on the partition 18. The line 21 is wound or coiled evenly on the member 19. Preferably the bottom ridge on the member 19 has its diameter enlarged so as to form a bottom flange 19' to facilitate holding the wound line on the member 19 while still enabling the line to be pulled freely down off the member 19 when required.

The upper and lower discs 14 and 13 are provided with an opening adjacent the bolt 12 through which the bottom end of the line 21 is passed. When the line 21 is wound on the member 19 and the bottom end of the line is passed down through the discs 14 and 13, the housing shell 16 is secured to the base 10 by having the upper disc 14 snapped into place in the outwardly extending annular groove 17 on the housing shell.

The entire device, consisting of the base assembly 10 together with the attached housing shell 16, is mounted on the outboard motor (or other object with which the device is to be used) by having the base assembly 10 secured thereto in any suitable manner. Thus, if the base assembly 10 includes a rubber suction cup, as preferred, no further attachment means is required. The bottom end of the line 21 preferably carries an eyelet 24, and, as an auxiliary means for maintaining the bottom end of the line secured to the outboard motor (or other object), the eyelet 24 is secured by a suitable screw, as shown in FIGURE 4.

When the outboard motor (or other object) with the device attached falls into the water and sinks to the bottom, the action of the water on the soluble disc 14 causes it to start to disintegrate within a few minutes. This releases the shell 16, together with the integral member 19, from the base assembly 10. The air in the sealed chamber A of the dome causes the released shell to rise to the surface of the water and the line 21 is pulled off of the member 19 as this occurs. Since the lower end of the line remains secured to the outboard motor (or other object) at the bottom of the water and the upper end of the line remains attached to the shell floating on the top of the water, the shell then acts as a marking buoy for indicating the location of the lost object.

Various modifications in the construction and shape of the device will be possible without departing from the principle of the invention but the device, constructed and shaped substantially as herein described, has proved very satisfactory in actual use and therefore this is regarded as the preferred form for the carrying out of the invention.

We claim:

1. A tracing buoy for use in the manner described comprising a base assembly, means in said base assembly enabling said base assembly to be attached to an article likely to be lost by submersion in water, a disc of gelatine in said base assembly, a bell-shaped housing having an open bottom and closed top, a transverse partition extending across in said housing between the bottom and top of the housing and causing the top of said housing to constitute a sealed air chamber, a frusto-conical member secured in said housing beneath said partition, a line wound on said member, means in said housing for securing the upper end of said line, ridges on the surface of said member for aiding in holding the wound line on said member, an annular groove near the bottom of said housing engaging the periphery of said gelatine disc enabling said housing to be attached to said base assembly and to remain attached as long as said disc is not impaired, a protective non-soluble disc mounted beneath said first mentioned disc in said base assembly, said protective disc being of smaller diameter than said first mentioned disc and not engaging said housing, the bottom end of said line passed down through said first mentioned disc and said protective disc, and means connected with said bottom end of said line for securing said bottom end to the article on which said buoy is mounted, whereby when the article with said buoy attached drops down into the water the disintegration of said first mentioned disc will cause said housing to become detached from said base assembly and to rise to the surface of the water with the upper end of said line.

2. A tracing buoy for use in the manner described comprising a base assembly, a suction cup in said base assembly enabling said base assembly to be attached to an outboard motor, a disc of gelatine attached to said suction cup in said base assembly, a plastic bell-shaped housing having an open bottom, a transverse partition extending across in said housing between the bottom and the top of said housing and causing the top of said housing to constitute a sealed air chamber above said partition, an inverted frusto-conical member secured to and extending down from said partition within said open bottom of said housing, a line wound on said member, means in said housing for securing the upper end of said line, annular ridges on the surface of said member for aiding in holding the wound line on said member, an annular groove in the bottom portion of said housing engaging the periphery of said gelatine disc for enabling said housing to be attached to said base assembly and to remain attached as long as said disc is not impaired, a bottom end of said line passed down through said disc, and means connected with said bottom end of said line for securing the bottom end to said outboard motor, whereby when said outboard motor with said buoy attached drops down into the water, the disintegration of said disc will cause said housing to become detached from said base assembly and to rise to the surface of the water with the upper end of said line.

References Cited

UNITED STATES PATENTS

| 1,719,838 | 7/1929 | Haselton | 9—9 |
| 2,198,755 | 4/1940 | Berndt | 9—9 |
| 3,105,980 | 10/1963 | Hinman | 9—9 |

MILTON BUCHLER, *Primary Examiner.*

T. MAJOR, *Assistant Examiner.*